United States Patent Office 3,360,585
Patented Dec. 26, 1967

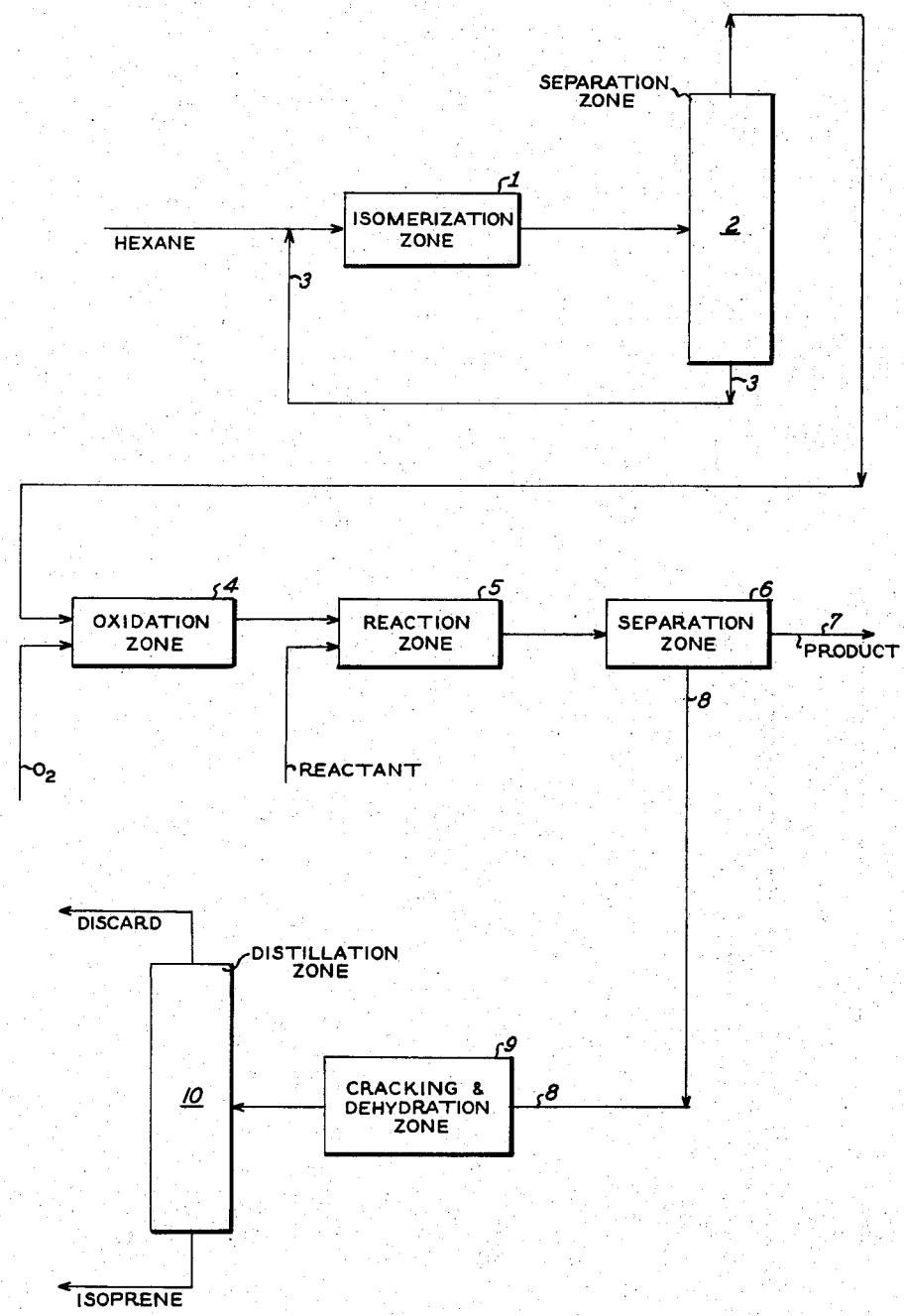

3,360,585
PROCESS FOR THE CO-PRODUCTION OF ISO-
PRENE AND OXYGENATED COMPOUNDS
Charles N. Winnick, Teaneck, N.J., assignor to Halcon
International, Inc., a corporation of Delaware
Continuation of application Ser. No. 458,676, May 25,
1965. This application Apr. 17, 1967, Ser. No. 631,555
8 Claims. (Cl. 260—681)

This is a continuation of application Ser. No. 458,676, filed May 25, 1965, now abandoned.

The present invention is directed to a new and improved process for the production of isoprene. In particular, the invention is concerned with the coproduction of isoprene and another valuable material such as an oxirane compound, an oxime, acrylic acid or acrylate, or the like.

Both isoprene and materials such as oxirane compounds and others as mentioned above are of very great commercial importance. Isoprene is an important monomer which finds wide utility in the production of "synthetic natural rubber" as well as in many other uses. Oxirane compounds such as propylene oxide likewise have an extremely wide use in the preparation of various polymers, surface active agents, and the like. The acrylate type compounds are, of course, exceedingly valuable in the formulation of various polymeric materials whereas oximes themselves are valuable and also serve as useful intermediates in the preparation of other chemicals. Although methods have previously been known for the preparation of these materials, there has been considerable room for improvement in the economy of the production of these materials by prior methods.

It is an object of the invention to provide a method for the production of isoprene, which method involves the coproduction of another valuable commercial material.

It is an object of the invention to provide an improved method for the coproduction of isoprene and an oxirane compound.

It is an object of the invention to provide an improved method for the coproduction of isoprene and an acrylic acid or ester.

It is an object of the invention to provide a method for the coproduction of isoprene and an oxygenated amine such as an oxime.

It is a particular object of the invention to provide a method for the coproduction of isoprene and propylene oxide using propylene, hexanes and air as the essential materials consumed in the process.

Other objects will be apparent from the following description of the invention.

The attached drawing illustrates in diagrammatic form the particular embodiment of the invention.

In accordance with the invention, a suitable hexane or mixture of hexanes having desirable structure for isoprene production is oxidized to the corresponding hydroperoxide or hydroperoxides. This hydroperoxide is catalytically reacted with another charge material under conditions such that the additional charge material is converted to the valuable coproduct while the hydroperoxide is converted to the corresponding alcohol or alcohol mixture. The resulting mixture is separated into the various components and the said coproduct is recovered. The alcohol is converted by dehydration and cracking techniques to the important isoprene product.

Important advantages are achieved through practice of the invention. A hexane hydrocarbon which is normally of but slight value is up-graded at very little cost while being used to produce important and valuable commercial products. The up-graded hexane in the much more valuable alcohol form is then conveniently converted to the very valuable product isoprene. There is a distinct and cooperative effect between the various steps of the inventive process since a material which is difficult to convert directly to isoprene is used in the preparation of another valuable chemical while simultaneously being converted to a form which is highly useful in isoprene production.

Referring to the drawing, the hexane charge material is most readily available as a normal hexane fraction containing varying amounts of hexane isomers as well as contaminants such as benzene and cyclohexane. In a first step of a preferred practice of the invention, the normal hexane fraction as commercially available is converted by an appropriate isomerization step in isomerization zone 1 to a mixture of hexane isomers. The desired isomeric hexanes having use in this invention are 2-methylpentane and 3-methylpentane. It will be apparent that these materials, if available, can be employed directly. Since the normal hexane fractions are most readily available it is generally necessary to subject these materials to the isomerization.

Isomerization of n-hexane is well documented in the literature. Catalysts such as $AlCl_3$ or hydrogenation type catalysts such as nickel on silica-alumina, molybdic oxide, tungsten sulfide, platinum or palladium are employed in the presence of hydrogen. Any of the known methods may be employed but it is preferred to employ those which function best at elevated temperatures in order to increase the yield of the desired isomers. This latter class encompasses the hydrogenation type catalysts. Isomerization conditions vary widely depending upon the catalyst employed and conversion desired. Appropriate conditions include temperatures of 100° to 400° C., preferably 150° to 350° C., pressures of atmospheric to 1000 p.s.i.g., preferably 100 to 500 p.s.i.g., and hydrogen to hydrocarbon mol ratios of 1/1 to 5/1, preferably 2/1 to 4/1. The isomerizations are preferably carried out in the vapor phase. Through this type of isomerization it is possible to obtain from n-hexane, an isomerizate containing about 50% 2+3-methylpentane, at an overall selectivity to branched chain hexanes of about 90%. Unconverted n-hexane and undesired isomers may be separated by distillation or equivalent means and recycled as indicated via line 3 from separation zone 2.

In oxidation zone 4, the mixture of hexane isomers (2 and 3-methylpentane) is oxidized with molecular oxygen in order to convert these hydrocarbons to the tertiary hydroperoxides 2-methyl-2-hydroperoxypentane and 3-methyl-3-hydroperoxypentane. The hydrocarbon oxidation is carried out in the liquid phase at temperatures broadly in the range from 100° to 200° C., preferably from 120° to 150° C., and at pressures ranging from about 75 to 500 p.s.i.g. Air which may be diluted with inert gases is employed as the source of molecular oxygen from other sources can also be employed. The oxidation is carried out under conditions effective to promote formation of the hydroperoxide. Hydrocarbon conversions per pass of the order of 10 to 50% are preferred. Various additives may be employed to stabilize the system and promote the production of the desired hydroperoxide.

The oxidate which contains the hydroperoxides, also contains the corresponding tertiary alcohols as a major by-product with small amounts of ketones. This oxidate may be employed directly in the subsequent reaction or concentrated to any desired degree.

The hydroperoxides from zone 4 are passed to zone 5 wherein the hydroperoxides are catalytically reacted with another reactant such as propylene to produce a valuable coproduct and to convert hydroperoxide to the corresponding alcohol, i.e., 2-methyl-2-hydroxypentane and 3-methyl-3-hydroxypentane.

In one embodiment, the hydroperoxide is reacted in zone 5 with an olefin in an epoxidation to convert the olefin to an oxirane compound and the hydroperoxide to alcohol.

The epoxidation is carried out in the presence of epoxidation catalysts which may be compounds of the following:

Ti, V, Se, Cr, Zn, Nb, Ta, Te, U, Mo, W and Re. The preferred catalysts are compounds of Mo, Ti, V, W, Re, Se, Nb and Te.

The amount of metal in solution used as catalyst in the epoxidation process can be varied widely, although as a rule it is desirable to use at least 0.00001 mol and preferably 0.002 to 0.03 mol per mol of hydroperoxide present. Amounts greater than about 0.1 mol seem to give no advantage over smaller amounts, although amounts up to 1 mol or more per mol of hydroperoxide can be employed. The catalysts remain dissolved in the reaction mixture throughout the process and can be reused in the reaction after removal of the reaction products therefrom. The molybdenum compounds include the molybdenum organic salts, the oxides such as $Mo_3O_3$, $MoO_3$, molybdic acid, the molybdenum chlorides and oxychlorides, molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will, to some extent depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such, for examples, as acetoacetonates may also be used. Specific and preferred catalytic compounds of this type for use in the invention are the naphthenates and carbonyls of molybdenum, vanadium, titanium, tungsten, rhenium, niobium, tantalum and selenium. Alkoxy compounds such as tetrabutyl titanate and other like alkyl titanates are very useful.

Temperatures which can be employed in the present invention can vary quite widely depending upon the reactivity and other characteristics of the particular system. Temperatures broadly in the range of about 20° to 200° C., desirably 0 to 150° C., and preferably 50° to 120° C. can be employed. The reaction is carried out at pressure conditions sufficient to maintain a liquid phase. Although sub-atmospheric pressures can be employed, pressures usually in the range of about atmospheric to about 1000 p.s.i.g. are most desirable.

As to the substrate, olefinically unsaturated materials which are epoxidized in accordance with the invention include substituted and unsubstituted aliphatic and alicyclic olefins which may be hydrocarbons or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, butadiene, styrene, methyl styrene, vinyltoluene, vinylcyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by method previously employed can be epoxidized in accordance with this process including olefinically unsaturated polymers.

The lower olefins having about 3 or 4 carbon atoms in an aliphatic chain are advantageously epoxidized by this process. The class of olefins commonly termed alpha olefins or primary olefins are epoxidized in the particularly efficient maner by this process. It is known to the art that these primary olefins, e.g. propylene, butene-1, decene-1, hexadecene-1, etc. are much more difficulty epoxidized than other forms of olefins, excluding only ethylene. Other forms of olefins which are much more easily epoxidized are substituted olefins, alkenes with internal unsaturation, cycloalkenes and the like.

In the oxidation of the substrate, the ratio of olefin substrate to organic peroxy compounds can vary over a wide range. Generally, mol ratios of olefinic groups in the substrates to hydroperoxide broadly in the range of 0.5:1 to 100:1, desirably 1:1 to 20:1 and preferably 2:1 to 10:1 are employed. Additionally, it is advantageous to carry out the reaction to achieve as high a hydroperoxide conversion as possible, preferably at least 50% and desirably at least 90%, consistent with reasonable selectivities.

Basic substances can be employed in the epoxidation. Such basic substances are alkali metal compounds or alkaline earth metal compounds. Particularly preferred are the compounds of sodium, potassium, lithium, calcium, magnesium, rubidium, cesium, strontium, and barium. Compounds which are employed are those which most peferably are soluble in the reaction medium. However, insoluble forms can be employed and are effective when dispersed in the reaction medium. Organic acid compounds such as a metal acetate, naphthenate, stearate, octoate, butyrate, and the like can be employed. Additionally, inorganic salts such as Na carbonate, Mg carbonate, trisodium phosphate, and the like can also be employed. Particularly preferred species of metal salts include sodium naphthenate, potassium stearate, magnesium carbonate, and the like. Hydroxides and oxides of alkali and alkali earth metal compounds can be used. Examples are NaOH, MgO, CaO, $Ca(OH)_2$, KOH, and the like, alkoxides, e.g. Na ethylate, K-cumylate, Na phenate, etc. Amides such as $NaNH_2$ can be used as can quaternary ammonium salts. In general, any compound of alkali or alkali earth metals giving a basic reaction in water can be used.

The compound is employed during the epoxidation reaction in amount of .05 to 10 mols/mol of epoxidation catalyst desirably .25 to 3.0 and preferably .50 to 1.50.

In a second embodiment the hydroperoxide is reacted in zone 5 with a primary amine to form oxygenated amine products such as ketoximes and to convert the hydroperoxide to alcohol. Conditions for this reaction are as follows:

Temperatures which can be employed in the amine oxidation vary quite widely depending upon the reactivity and other characteristics of the other reactants. Temperatures broadly in the range of about −10° to +175° C., desirably 25° to 130° C. and preferably 60° to 110° C., can be employed. The reaction is carried out at pressure conditions sufficient to maintain a liquid reaction phase. Although sub-atmospheric pressures can be employed, pressures usually in the range of about atmospheric to somewhat above are most desirable.

The catalysts include compounds of the following: Ti, V, Cr, Se, Zr, Nb, Mo, Te, Ta, W, Re, and U. These may be characterized as forming peracids or as hydroxylation catalysts.

The amount of metal in solution used as catalyst in the process can be varied widely, although as a rule it is desirable to use at least 0.00001 mol and more preferably 0.001 to 0.1 mol per mol of hydroperoxide present. Amounts greater than about 0.1 mol seem to give no advantage over smaller amounts. The catalysts remain dissolved in the reaction mixture throughout the process and can be reused in the reaction after removal of the reaction products therefrom. The ratio of the hydroperoxide to the amine is in the range of 0.01 to 10 mols per mol of the amine, preferably 0.5 to 2.

The molybdenum compounds include the molybdenum organic salts, the oxides such as $Mo_2O_3$, $MoO_2$, molybdic acid, $MoO_3$, the molybdenum chlorides and oxychlorides, molybdenum fluoride, phosphate, sulfide, and the like. Hetero-polyacids containing molybdenum can be used as can salts thereof; examples include phosphomolybdic and the sodium and potassium salts thereof. Corresponding or analogous compounds of the other metals mentioned above may be used.

It has been discovered that titanium compounds have unexpected and surprising utility in this reaction. Titanium compounds have been found to be outstandingly effective in the reaction of organic hydroperoxides with amines.

Inorganic as well as organic titanium compounds can be used, although organic compounds give much better results. Preferred titanium compounds are esters or salts of organic acids and are preferably derived from aliphatic or aromatic alcohols and organic acids. Specific examples are tetra n-butyl titanate, di n-butyl di (2,6 di-t-butyl p-cresyl) titanate, n-butyl trioleoyl titanate, tetra o-cresyl titanate, tetra t-butyl titanate, titanium naphthenate, titanium stearate, titanium ethylhexoate, titanium acetate, and the like. Inorganic compounds such as titanium tetrachloride and the like are useful.

With titanium compounds which hydrolyze readily, it is desirable to remove water of oxidation from the reaction zone during the reaction such as by azeotroping with benzene or the like.

For practice of the present invention, catalytic components may be employed in the form of a compound or mixture which is initially soluble in the reaction medium. While solubility will, to some extent depend on the particular reaction medium employed, suitably soluble substances contemplated by the invention would include hydrocarbon-soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such, for example, as acetoacetonates may also be used. Specific and preferred catalytic compounds of this type for use in the invention are the naphthenates and carbonyls of molybdenum, vanadium and tungsten and especially the various titanium compounds.

The oxidation reaction time will vary depending upon the conversion desired. Very short reaction times can be employed where low conversion and/or very active materials are employed. Normally, reaction times from about 1 minute to 6 hours and desirably from 5 minutes to 2 hours are employed.

The amines used are primary and the amine group may be attached to a primary or secondary saturated carbon atom, and may contain 1 to 20 carbon atoms, preferably 4 to 16 carbon atoms, e.g., benzylamine, isopropylamine, n-butylamine, cyclohexylamine, cyclooctylamine, cyclododecylamine and the like amine substituted saturated aliphatic groups, which may be cyclic or acrylic, which groups may contain cyclic aryl or alkyl substituents.

The concentration of the amine in the reaction mixture may be in the range of 5 to 60% by weight, preferably in the range of 5 to 15%.

The concentration of hydroperoxides in the oxidation reaction mixture at the beginning of the reaction will normally be one percent or more although lesser concentrations will be effective and can be used.

The reaction is suitably carried out in the substantial absence of water. Relatively small amounts of water can be tolerated during the reaction but it is preferable to exclude water from the system during the major part of the reaction.

The process is most advantageously carried out in the presence of a solvent.

A preferred solvent or diluent is t-butanol. However, other alcohols such as t-amyl alcohol, di-methyl propyl carbinol, methyl diethyl carbinol, dimethyl phenyl carbinol and the like may be used. Primary or secondary alcohols may also be used, such as methanol, ethanol, n- or i-propanol, i- or n- or s-butanol as well as analogous pentanols or hexanols. Also, ethers such as diethyl ethers, ketones such as cyclohexanone may be used. The lower aromatic hydrocarbons are suitable solvents as are the lower boiling chlorinated hydrocarbons including chlortoluene.

Where the oxime produced is intended as an intermediate for further synthesis, one may use the crude oxime. If the oxime is to be rearranged, an acid such as sulfuric acid may be mixed with the oxime and heated, in known manner, to convert cyclohexanone oxime to caprolactam.

An important feature of the invention is that cyclohexyl hydroxylamine may be made and this can be further air oxidized to the oxime. Production of this product has the advantage that only 1 mol of hydroperoxide is consumed to make it while 2 mols are needed to produce oxime.

In a third embodiment the hydroperoxide is reacted in zone 5 with an unsaturated aldehyde to form an unsaturated acid or ester and to convert the hydroperoxide to alcohol.

The reaction of the hydroperoxide with the acrolein or methacrolein may be carried out in any convenient solvent or diluent, but the tertiary butyl alcohol is preferred for making the acid, the esterifying alcohol being used for making the ester directly, where desired. Generally, the latter alcohol is primary, or sometimes secondary, preferably of one to twelve carbon atoms.

Other alcohols such as t-amyl alcohol, dimethyl propyl carbinol, methyl diethyl carbinol, dimethyl phenyl carbinol and the like may be used for making the acid. Primary or secondary alcohols may be used, such as methanol, ethanol, n- or i-propanol, i- or n- or s-butanol and the like pentanols or hexanols may be used. Also for making the acid, ethers such as diethyl ether esters, ketones such as acetone may be used; or acids such as acetic acid and the like may be used as well as esters thereof such as methyl, ethyl, propyl, butyl, and the like. The lower aromatic hydrocarbons are suitable as well as the lower boiling chlorinated hydrocarbons including chlortoluene. Other saturated hydrocarbons or even unsaturated hydrocarbons may be used including purified butylenes, hexylenes, propylene trimers or tetramers, or butylene dimers or trimers using appropriate pressure to maintain the solvent in a liquid phase.

Alternate catalysts can be used for the reaction of hydroperoxides and methacrolein, but chromic acid is preferred for making the acid. Other catalysts may include phosphomolybdic acid, tungstochromic acid, selenochromic acid, phosphovanadic acid, and the like.

In producing the methyl ester directly from the aldehyde, the reaction is conveniently carried out by adding the hydroperoxide or mixture thereof together with a redox agent to a solution of the alpha, betaethylenic aldehyde in the chosen reactive medium, for example, methanol or the like. Ferrous or ferric ion is a particular useful redox agent and can be introduced by adding ferrous or ferric chloride or other soluble iron salt to the reaction mixture. However, any of the many other known redox agents can be used instead of or together with the ferrous or ferric ions in the new process. Suitable examples of such redox agents include the ions of other heavy metals which are capable of existence in several valence states such as cobaltous, manganous, cuprous, titanous, chromous, vanadous and like ions.

In some cases sodium bisulfite, 1-ascorbic acid, sodium formaldehyde sulfoxylate, the reducing sugars, and the like may be used to reduce the higher valence ions. The reducing agent or mixture of agents used is employed in an amount equivalent to or in an excess of, for instance, up to about 10%, the stoichiometric requirement for reduction of the t-butyl hydroperoxide. Instead of a stoichiometric amount of ferrous ions, one can, if desired, use in the process a trace of a multivalent metal, preferably ferrous or ferric ion together with another of the aforementioned other reducing agents in stoichiometric amount which will serve to reduce the ferric ion to ferrous ion as fast as the ferric ion is formed.

Ferrous ion is the preferred promoter in this type of operation and is advantageously used in amounts of about 0.25 to about 1 equivalent per mol of hydroperoxide employed. In either case, a temperature of about $-20°$ C. to about $150°$ C. can be used although it is generally preferable to employ temperatures of about $0°$ to about $+20°$ C. in order to minimize loss of aldehyde either through volatilization or side reaction. The time of reaction is not critical.

In another alternative, the reaction is carried out by adding t-butyl hydroperoxide or mixture containing it and a redox agent to a solution of an aldehyde such as an alpha, beta-ethylenic aldehyde in the appropriate reactive primary or secondary alkanol, for example, methanol, ethanol, or other non-tertiary alcohol having up to about 12 carbon atoms in the molecule. Ferrous or ferric ion is a preferred redox agent, and it can be introduced by adding ferrous or ferric chloride or other soluble iron salt or salts to the reaction mixture; chlorides and bromides are the preferred salts. Other known redox agents which can be used instead of or together with the ferrous or ferric ions in the new process include cobaltous, manganous, stannous, cerous, nickelous, plumbous, titanous, chromous, vanadous and the like ions in solution, or mixtures thereof. These metals have atomic numbers 22 to 28, 50, 58 to 82.

The redox agent or mixtures thereof can be employed in stoichiometric amounts relative to the hydroperoxide or in excess thereof, e.g. up to about double the amount. However, less than stoichiometric amounts are operable and generally preferable. In general at least 0.05 equivalent of redox agent or agents per equivalent of hydroperoxide is used; a desirable range is 0.1 to or equivalent of agent per equivalent of hydroperoxide. As compared to the cupric ion method, this modification may be regarded as catalytic, in view of the lower amount of ion.

The redox agents may be employed in any one of their valence states. For example, equally good results are obtained with either ferrous or ferric chloride. An acidic environment is sometimes desirable, and it is achieved by adding a small amount of sulfuric or hydrochloric or other strong acid to the reaction mixture. A redox couple may be employed, for example, ferrous ferric or cobaltous-cobaltic, and the like, or a mixed couple such as cobaltous ferric, manganous-stannic and the like.

While chlorides and bromides are preferred, compounds containing other anions may be employed in practicing this alternative to produce esters. These give similar results to those shown in Examples 1 and 2 and either iron halide or mixtures thereof are preferred.

For making the ester directly, one may employ the aldehyde, the hydroperoxide, the alkanol such as methanol or the like and chromic acid (or phosphomolybdic, tungstochromic, selenochromic, phosphovanadic acid, or the like).

The concentration of the aldehyde or acrolein in the reaction mixture may be in the range of 1 to 50% by weight, preferably in the range of 10 to 20%. The reaction temperature may be from $-50°$ C. to $+150°$ C. desirably $0°$ to $100°$ C., and preferably in the range of room temperature or somewhat below up to about $60°$ C. The pressure may be atmospheric, or above or below, and the reaction time may be in the range of 10 minutes to 6 hours, and desirably 0.5 hour to 3 hours. For many runs, a one hour reaction time is suitable.

The ratio of the hydroperoxide is in the range of 0.1 to 2 mols per mol of the acrolein, preferably 0.5 to 1.0.

The process may be carried out batchwise, or in an intermittent or continuous manner. As the latter, the reaction may be carried out in an elongated reaction zone such as a tube or a tower or a plurality of reactors connected in series, and the hydroperoxide may be introduced at space points along the path of flow of the solution or mixture.

If it is desired to produce an ester of methacrylic acid from the acid the appropriate alcohol may be added to the reaction mixture. The reaction mixture containing the added alcohol such as methanol is heated to effect esterification and remove the water formed. Then the mixture may be separated into fractions by distillation. Any catalyst present remains in the residue and it may be recovered and reused in the oxidation step.

Other embodiments are possible. The reaction mixture from zone 5 is passed to separation zone 6 wherein by appropriate distillation operations the mixture is resolved into its components. The coproduct is depicted as being removed via line 7.

The alcohols are removed via line 8 and passed to cracking and dehydration zone 9. Although the separation zone 6 is simply shown, this zone preferably comprises a series of separate distillation columns. In these columns the unreacted portion of the charge materials is recoverd and can be recycled to the process (not shown). Catalyst is also recovered and can be recycled.

In cracking and dehydration zone 9, the alcohols are converted to isoprene. Suitable temperatures for this dehydration and cracking are broadly in the range of $500°$ to $750°$ C. and preferably $550°$ to $700°$ C. The cracking and dehydration is carried out in the vapor phase at pressures generally from atmospheric to 50 p.s.i.g. and preferably from atmospheric to 10 p.s.i.g. Residence times in the reaction zone are generally 0.01 to 5 seconds and preferably 0.1 to 1.0 second. Various promoters such as hydrogen bromide and other bromine compounds as well as materials such as hydrogen sulfide and ammonium sulfide are advantageously used in this reaction step. Steam is usually employed as diluent.

The cracking and dehydration product from zone 9 is distilled in column 10 and the product isoprene fraction is separated as buttoms from an overhead waste product stream.

It will be apparent to skilled workers from the above description that numerous other embodiments of the invention are possible. For example, where a concentrated fraction of one of the desired hexane precursors is available it would not be necessary to include the isomerization step. Additionally, depending on the coproduct compound, the product separation steps for the reaction effluents from zone 5 can be changed. Still further, although the cracking and dehydration to isoprene is shown as taking place in a single reaction zone, it will be appreciated that these reactions can be separately carried out in different reaction zones without departing from the essence of the invention. Ketones made during the initial peroxidation may be separated from the alcohol fraction and hydrogenated to secondary alcohols which are also isoprene precursors.

EXAMPLES

Isomerization of n-hexane

A commercial n-hexane fraction was isomerized in vapor phase. The catalyst employed was 5% Ni on silica-alumina. The isomerization was carried out at 370° C. and 25 atm. pressure with a hydrogen/hydrocarbon mol ratio of 4/1 and a liquid space velocity of 1 vol./vol./hr. The isomerizate which was obtained in 95% selectivity had the following composition; 5% 2,2-dimethylbutane, 5% 2,3-dimethylbutane, 34% 2-methylpentane, 24% 3-methylpentane, 27% n-hexane and 5% others. The isomerizate was distilled at atmospheric pressure in a 50 plate column with a 10/1 reflux ratio and a fraction representing 57% of the isomerizate and containing 95% 2- and 3-methylpentanes was recovered. The ratio of 2-methylpentane to 3-methylpentane in the recovered fraction was about 1.45/1.

Oxidation of hexanes

The recovered hexane fraction containing 95% 2- and 3-methylpentanes was oxidized in a 316 s.s. autoclave which had been thoroughly cleaned and washed with a sodium pyrophosphate solution. The oxidation was conducted at 130° C., 250 p.s.i.g. with air as oxidizing gas. An initiator, di-t-butyl peroxide in amount of 0.1% by weight of the charge was employed. After 6 hours the conversion was 20% and the selectivity to hydroperoxide was 55%. The effluent was distilled at 200 mm. Hg to remove unreacted hexane leaving a concentrate containing 58% by weight of hydroperoxide calculated as hydroperoxy-hexane together with mainly 2-methyl 2-hydroxypentane and 3-methyl 3-hydroxy pentane.

Epoxidation

To 50 grams of the above hydroperoxide concentrate (containing 0.246 mole of hydroperoxide) in a pressure vessel was added 84 grams (2 moles) of propylene and 0.5 gram of molybdenum naphthenate (containing 5% Mo). The mixture was heated at 100° C. for 2 hours. After completion of the reaction the effluent was fractionally distilled at atmospheric pressure in a 5-plate column at 5/1 reflux ratio to recover propylene and propylene oxide and methylpentanols as separate product fractions as follows:

| Cut | Head Temp., ° C. | Amount, g. | Composition |
|---|---|---|---|
| 1 | −46 to −30 | 77.0 | $C_3H_6$. |
| 2 | −30 to 33 | 1.0 | |
| 3 | 33 to 36 | 10.2 | Propylene oxide. |
| 4 | 36 to 118 | 0.8 | |
| 5 | 118 to 133 | 45.0 | Methylpentanols and ketones. |

The yield of oxide based on hydroperoxide was 72%. Hydroperoxide conversion was substantially complete.

Cracking

The methyl pentanol fraction (2-methyl-2-hydroxypentane and 3-methyl-3-hydroxypentane) from above was simultaneously dehydrated and cracked in a tubular reactor with a hydrogen bromide catalyst. The conditions were 675° C., residence time 0.2 second, 4.3 mol percent HBr based on alcohol added as promoter and steam in amount of 1 mol per mol alcohol. The yield of isoprene based on methyl pentanols was 45% and the reaction selectivity 61% (based on recovered $C_6$ olefin). The reactor effluent is quickly quenched to 30° C. and distilled at atmospheric pressure in a 30-plate column with a reflux ratio of 10/1. The isoprene cut is recovered at 33–35° C. and the methylpentane cut at 60–70° C.

Oxidation of primary amine

A solution of 19.8 grams (0.2 mol) of cyclohexylamine in 112 grams of benzene containing 0.002 mole of tetra-n-butyltitanate was refluxed with an overhead condenser and water separator. To this solution 20.4 grams of the hydroperoxide concentrate above obtained was added during a 10-minute period. After completion of this addition, the resulting mixture was refluxed at 80–83° C. for an additional 1 hour. The resulting reaction mixture upon analysis by gas chromatography was found to contain 0.036 mole of cyclohexanone oxime. This represents a 72% product yield based on hydroperoxide. Hydroperoxide conversion was 100%. The resulting reaction mixture was distilled in order to separate the various product fractions. The cyclohexanone oxime was recovered while the mixture of methylpentanols was converted to isoprene as described above. The reaction effluent was distilled through a 10-plate column at 5/1 reflux ratio.

| Cut | Head Temp. | Press. | Wt., g. | Composition |
|---|---|---|---|---|
| 1 | 79–82 | Atm | 95 | Benzene. |
| 2 | 82–118 | Atm | 2 | Intermediate cut. |
| 3 | 118–140 | Atm | 32 | Methylpentanols + cyclohexylamine. |

The residue containing the oxime was flash distilled at 5 mm. to recover oxime overhead and leave catalyst behind.

The cyclohexylamine was separated from the alcohols by extraction with dilute HCl followed by neutralization and distillation.

Oxidation of methacrolein

A solution of 7.5 grams of methacrolein (0.107 mole), 17.5 grams of the above hydroperoxide concentrate, and 0.25 gram of $Cr_2O_3$ in 35 grams of anhydrous t-butanol was reacted for 4 hours at 45° C. Hydroperoxide conversion was 91%. Analysis of the reaction effluent showed that 74% of the methacrolein was converted with the selectivity to methacrylic acid being 52%.

The reaction mixture was distilled in a 5-plate still at atmospheric pressure. Methacrolein, 1.9 g., was recovered at 50/53° C. and t-butanol at 82–83° C. The bottoms were extracted with 100 ml. of 5% sodium bicarbonate solution. The aqueous phase was acidified with hydrochloric acid, extracted with ether and the ether evaporated leaving 4.2 grams of residue containing 3.5 grams of methacrylic acid. The organic phase from the bicarbonate extraction was distilled at atmospheric pressure through a 5 plate still at 3/1 reflux ratio and a cut taken at 118–140° C. consisting mainly of hexanols (14.8 g.). The mixture of methylpentanols was converted to isoprene in the manner described above.

What is claimed is:

1. In a process for the production of isoprene including the steps of oxidizing an isohexane selected from the group consisting of 2-methyl-pentane and 3-methylpentane to the corresponding hydroperoxide, reducing said hydroperoxide to the corresponding alcohol, and dehydrating and cracking said alcohol to isoprene, the improvement wherein said reducing step is carried out by catalytically reacting said hydroperoxide with a member selected from the group consisting of an olefinically unsaturated compound and a primary amine, said member containing 2 to 30 carbon atoms, under conditions effective to convert said hydroperoxide to the corresponding alcohol and to convert said member to an oxygenated product.

2. A process according to claim 1 wherein said member is an olefinically unsaturated compound comprising an olefin and said oxygenated product is an oxirane.

3. A process according to claim 2 wherein said olefin comprises propylene and said oxirane comprises propylene oxide.

4. A process according to claim 1 wherein said member is an olefinically unsaturated compound comprising an acrylic compound and said oxygenated product is selected from the group consisting of acrylic acid and an acrylate.

5. A process according to claim 4 wherein said acrylic compound is methacrolein and said oxygenated product is methacrylic acid.

6. A process according to claim 1 wherein said member is a primary amine and said oxygenated product is an oxime.

7. A process according to claim 6 wherein said primary amine is cyclohexylamine and said oxime is cyclohexanone oxime.

8. A process according to claim 1 including the step of isomerizing n-hexane to obtain said isohexane.

References Cited
UNITED STATES PATENTS

| | | | |
|---|---|---|---|
| 2,744,929 | 5/1956 | Smith et al. | 260—530 |
| 3,096,376 | 7/1963 | Clement et al. | 260—681 |
| 3,206,510 | 9/1965 | Weiss et al. | 260—563 |

OTHER REFERENCES

Hawkins, E. G. E., J. Chem. Soc. (London), 1950, pp. 2169–73.

PAUL M. COUGHLAN, Jr., *Primary Examiner.*

DELBERT E. GANTZ, *Examiner.*

G. E. SCHMITKONS, *Assistant Examiner.*